United States Patent [19]
Nurse

[11] 3,985,095
[45] Oct. 12, 1976

[54] GEAR SHIFT INDICATOR

[75] Inventor: Charles Alexander Nurse, Houghton Regis, England

[73] Assignee: General Motors Corporation, Detroit, Mich.

[22] Filed: Dec. 10, 1975

[21] Appl. No.: 639,252

[30] Foreign Application Priority Data
Jan. 9, 1975  United Kingdom.................. 906/75

[52] U.S. Cl. .................... 116/124 M; 116/DIG. 20
[51] Int. Cl.² .......................................... G09F 9/00
[58] Field of Search ............... 116/DIG. 20, 124 M, 116/130, 114 H, 133, 124 R, 114 R, 115.5; 74/473 R, 441

[56] References Cited
UNITED STATES PATENTS

| | | | |
|---|---|---|---|
| 2,303,049 | 11/1942 | Ingalls............................ | 116/124 R |
| 2,434,470 | 1/1948 | Rhodes .......................... | 116/114 R |
| 2,980,055 | 4/1961 | Burns.............................. | 116/133 |
| 3,896,759 | 7/1975 | Ogura ............................ | 116/124 R |

FOREIGN PATENTS OR APPLICATIONS

| | | | |
|---|---|---|---|
| 1,295,083 | 11/1972 | United Kingdom.......... | 116/DIG. 20 |
| 1,211,452 | 11/1970 | United Kingdom.......... | 116/DIG. 20 |

Primary Examiner—S. Clement Swisher
Assistant Examiner—Denis E. Corr
Attorney, Agent, or Firm—John P. Moran

[57] ABSTRACT

A gear shift indicator for an automatic gear change in a motor vehicle comprising a gear lever pivotally mounted within a housing for movement in and along an elongated slot in the surface portion of said housing and into a number of predetermined positions, said surface portion having a window adjacent said slot, through which window is visible one of a series of legible characters carried on a movable indicator member located within said housing adjacent said surface portion, each legible character corresponding to a respective one of said predetermined positions, there being a movable member coupled between said gear lever and said movable indicator member in a movement-increasing arrangement that has a ratio of movement between the characters on the movable indicator member and the gear lever of more than 1 to 1, the spacing of the characters on said indicator member being such that, when the gear lever is in each of said predetermined positions, the corresponding character is visible through said window. With such a gear selector it is possible to obtain a relatively wide spacing between adjacent characters even though the corresponding movement of the gear lever is small.

8 Claims, 1 Drawing Figure

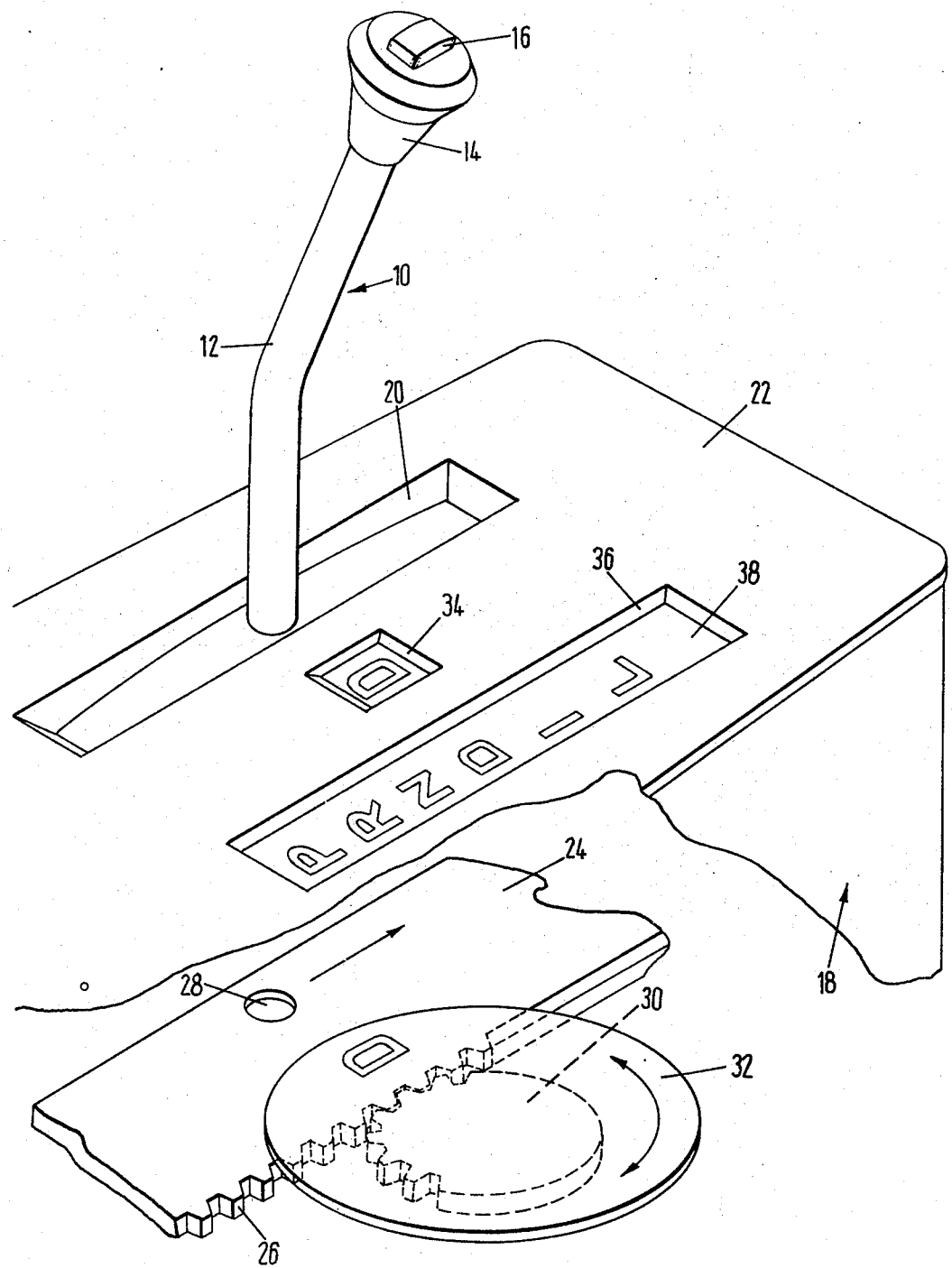

GEAR SHIFT INDICATOR

This invention relates to gear shift indicators for motor vehicles. In particular, it relates to a gear shift indicator for an automatic gear change in a motor vehicle in which a gear lever is movable to and fro in a straight line between a number of predetermined positions, each one of which represents a particular gear position for the automatic gear change.

In known forms of gear shift indicator it is customary to provide a schematic diagram of the possible gear positions either on the gear lever itself or, as in the majority of shift indicators for automatic gear changes, alongside or adjacent the gear lever. Such diagrams suffer from the disadvantage that the driver of the vehicle cannot always readily discern from the diagram the particular gear position of the gear lever, particularly when driving at night. Attempts have been made to overcome this disadvantage by providing illuminable scales or pointers coupled to the gear lever, but these are not completely successful, particularly where the design of the gear shift mechanism is such that the gear lever is only moved through a relatively small distance in order to change from one gear position to another, as it can be difficult to distinguish between small increments of movement when viewed from a distant point.

A gear shift indicator for a motor vehicle according to the invention comprises a gear lever pivotally mounted within a housing for movement in and along an elongated slot in a surface portion of said housing and into a number of predetermined positions, a window adjacent said slot, a movable indicator member located within said housing adjacent said surface portion and carrying discrete legible characters thereon, each of which corresponds to a respective one of said predetermined positions, and a movable member coupled between said gear lever and said movable indicator member in a movement-increasing arrangement having a ratio of movement between the characters on the movable indicator member and the gear lever of more than 1 to 1, the spacing of the characters on said indicator member being such that, when the gear lever is in each of said predetermined positions, the corresponding character is visible through said window. With such a gear shift indicator, it is possible to obtain a relatively wide spacing between adjacent characters even though the corresponding movement of the gear lever is small.

Preferably the movable member is a rack, the movable indicator member is a disc, and the teeth on said rack mesh with those on a pinion mounted co-axially on said disc.

In such a preferred gear shift indicator according to the invention, the characters are arranged on one side of the disc adjacent the peripheral edge thereof.

The disc may be formed from a translucent material, which is illuminable by edge-lighting by means of a souce of illumination arranged adjacent the edge of the disc.

Alternatively, the disc may be illuminable by floodlighting by means of a source of illumination arranged inside the housing to flood the upper surface of the disc with light.

A suitable velocity ratio between the characters on the disc and the gear lever is obtained by making the diameter of the disc at least twice that of the pinion.

Advantageously, the rack is a substantially flat elongated plate having teeth along one elongated edge and an opening through which passes the gear lever, said plate acting as a movable cover for, and thus closing, said elongated slot. This arrangement prevents the ingress of dust and like material into the housing through the elongated slot.

In a preferred embodiment of the gear shift indicator of the invention, there is a second elongated slot formed in said surface portion, said second elongated slot being of similar dimensions to said elongated slot and being located alongside and parallel to said elongated slot. Said second elongated slot houses an illuminable indicator strip carrying a schematic indication of the spacial relationship of each one of said predetermined positions relative to the other predetermined positions. As a result the driver of a vehicle equipped with such a gear shift indicator can readily determine the direction in which the gear lever must be moved to select a given gear as well as easily seeing which gear position the gear lever is in.

This preferred embodiment can be further modifiied so that the housing is adapted to form part of a console between a driver's seat and a passenger seat of a motor vehicle, and the elongated slot and the second elongated slot are arranged in complementary positions to one another in said surface portion. Consequently, if the housing is installed in a left-hand drive vehicle, the gear lever is located in the elongated slot and the illuminable indicator strip is located in the second elongated slot, and, if the housing is installed in a right-hand drive vehicle, the gear lever is located in the second elongated slot and the illuminable indicator strip is located in the elongated slot. Thus it can be seen that such a modification of the preferred embodiment results in the production of a gear shift indicator capable of being installed in either a right-hand or left-hand drive vehicle without requiring further modification.

As an example, the aforesaid preferred embodiment of the gear shift indicator of the invention will now be particularly described with reference to the accompanying drawing, which drawing shows an exploded isometric view of said gear shift indicator with parts broken away.

Referring to the drawing, a gear lever 10, comprising a shaft 12 surmounted by a knob 14 housing a spring-loaded detent member 16, is pivotally mounted within a housing 18 for movement in and along an elongated slot 20 in a planar portion 22 of said housing. The gear lever 10 is movable between a number of predetermined positions, namely park (P), reverse (R), neutral (N), drive (D), intermediate (I), and low (L), a two-stage stop actuated by the spring-loaded detent member 16 preventing the accidental selection of 'L', 'I', 'R' and 'P'. Partial depression of the detent member 16 is necessary before 'I' or 'R' can be selected, and full depression of the detent member 16 against increased spring force is required before 'L' and 'P' can be selected.

Situated directly below the planar portion 22 is a movable slide member 24 in the form of a rack having the shape of an elongated flat plate having teeth 26 formed along one elongated edge thereof. The movable slide member 24 is supported within guide channels (not shown) in the housing, and the shaft 12 of the gear lever passes through a hole 28 in slide member 24. The width and length of slide member 24 is such that it forms a cover for the elongated slot 20 in all six positions of the gear lever 10, thus effectively sealing the housing 18 against the ingress of dust and similar extraneous matter.

The teeth 26 of slide member 24 mesh with those of a pinion 30 rotatably mounted within the housing 18 on a shaft (not shown) secured to the housing. A flat disc 32, made of a translucent material such as an acrylic resin, is rotatably mounted on said shaft co-axial to the pinion 30 and secured thereto. The diameter of the flat disc 32 is at least twice that of the pinion 30, so that a substantial portion of the disc 32 overlies the slide member 24. The upper surface of the disc 32 carries, adjacent the peripheral edge of said disc, the characters 'P', 'R', 'N', 'D', 'I' and 'L' formed in an opaque material printed or embossed on the upper surface of the disc. Directly above the disc 32, adjacent the peripheral edge thereof, there is located a window 34 in the overlying planar portion 22, which window gives visual access to the upper surface of the disc 32. The size of each character on the upper surface of the disc is such as to be readily distinguishable and also to fall completely within the boundary of the window 34. The position of each character relative to the adjacent characters on the upper surface of the disc 32 is dictated by the distance moved by the disc beneath the window 34 as the gear lever 10 moves from the corresponding gear positon to the next gear position.

The characters seen through the window 34 are rendered easily visible at night by illuminating disc 32 either by a form of edge-lighting, which will cause the background to the character in the window 34 to glow, on by a form of flood-lighting, which will illuminate the character and background in the window 34 by an even, shadowless, light.

A second elongated slot 36 in the planar portion 22 houses an illuminable indicator strip 38 carrying a schematic indication of the six gear positions 'P', 'R', 'N', 'D', 'I' and 'L' arranged in linear sequence to one another, corresponding to the positions of the gear lever 10 in the slot 20 for the six gear positions. The slot 36 is of similar dimensions to slot 20 and is arranged in the planar portion 22 parallel to slot 20 and at the same distance from the centre of the window 34 as is the slot 20.

Because of the similarity in size and placing of slots 20 and 36 in planar portion 22, and the fact that they are arranged symmetrically relative to window 34, this embodiment of the gear shift indicator of the invention can be easily modified for installation in either a left-hand drive vehicle or a right-hand drive vehicle.

As shown in the drawing, the gear shift indicator is arranged for installation in a left-hand drive vehicle, with the gear lever 10 located in slot 20 and the indicator strip 38 located in slot 36. To arrange the gear shift indicator for installation in a right-hand drive vehicle merely entails locating the gear lever 10 in slot 36, locating the indicator strip 38 in slot 20, turning over slide member 24 in its guide channels, moving the shaft passing through pinion 30 and disc 32 laterally relative to window 34, and replacing disc 32 shown in the diagram with another similar disc in which the positions of the characters are reversed.

The illumination chosen for the indicator strip 38 can be either edge-lighting or flood-lighting, but, in either case, the illumination is arranged to be less bright than that used on the disc 32, so that the illuminated area of window 34 is more noticeable than the illuminated area of strip 38.

Thus the gear shift indicator of the invention provides a clear visible indication of the gear selected to the driver of a vehicle in which said gear shift indicator is installed, both by day and by night, thus reducing the risk of a driver, particularly one inexperienced in driving the particular type of vehicle concerned, choosing a wrong gear position whilst driving the vehicle.

I claim:

1. A gear shift indicator for a motor vehicle comprising a housing mountable within said motor vehicle and with a surface portion having an elongated slot and, adjacent said slot, a window formed therein; a gear lever pivotally mounted within said housing for movement in and along said slot into a number of predetermined positions relative to said slot; a movable indicator member located within said housing adjacent said surface portion, said indicator member carrying discrete legible characters thereon, each of which corresponds to a respective one of said predetermined positions; and a movable member coupled between said gear lever and said movable indicator member to form a movement-increasing arrangement having a ratio of movement between the characters on the movable indicator member and the gear lever of more than 1 to 1, the spacing of the characters on said indicator member being such that, when the gear lever is in each of said predetermined positions, the corresponding character is visible through said window.

2. A gear shift indicator for a motor vehicle comprising a housing mountable within said motor vehicle and including a surface portion having an elongated slot and, adjacent said slot, a window formed therein; a gear lever pivotally mounted within said housing for movement in and along said slot into a number of predetermined positions relative to said slot; a movable indicator member located within said housing, said indicator member including a disc adjacent said surface portion and a toothed pinion mounted co-axially with respect to said disc, said disc carrying discrete legible characters thereon, each of which corresponds to a respective one of said predetermined positions; and a rack member movably mounted upon said gear lever and having teeth formed thereon, which teeth mesh with those on said toothed pinion to translate linear movement of said gear lever into rotary movement of said indicator member in a movement-increasing arrangement having a ratio of movement between the characters on the disc and the gear lever of more than 1 to 1, the spacing of the characters on said disc being such that, when the gear lever is in each of said predetermined positions, the corresponding character is visible through said window.

3. A gear shift indicator according to claim 2, in which said rack member is a substantially flat, elongated plate having teeth along one elongated edge and an opening through which passes said gear lever, said plate acting as a movable cover for, and thus closing, said elongated slot.

4. A gear shift indicator for a motor vehicle comprising a housing mountable within said motor vehicle and having a surface portion which has an elongated slot and, adjacent said slot, a window formed therein; a gear lever pivotally mounted within said housing for movement in and along said slot into a number of predetermined positions relative to said slot; a movable indicator member located within said housing, said indicator member including a disc, having a peripheral edge, adjacent said surface portion and a toothed pinion mounted co-axially with respect to said disc, said disc carrying discrete legible characters on one side adjacent the peripheral edge thereof, each of which corresponds to a respective one of said perdetermined positions; and a rack member movably mounted upon said gear lever and having teeth formed thereon, which teeth mesh with those on said toothed pinion to translate linear movement of said gear lever into rotary movement of said indicator member in a movement-increasing arrangement having a ratio of movement between the characters on the disc and the gear lever of more than 1 to 1, the spacing of the characters on said disc being such that, when the gear lever is in each of said predetermined positions, the corresponding character is visible through said window.

5. A gear shift indicator for a motor vehicle comprising a housing mountable within said motor vehicle and having a surface portion which has an elongated slot and, adjacent said slot, a window formed therein; a gear lever pivotally mounted within said housing fo movement in and along said slot into a number of predetermined positions relative to said slot; a movable indicator member located within said housing, said indicator member including a disc having a peripheral edge adjacent said surface portion and a toothed pinion mounted co-axially with respect to said disc, said disc being formed from a translucent material and carrying discrete legible characters on one side adjacent the peripheral edge thereof, each of which corresponds to a respective one of said predetermined positions; an edge-illumination means within said housing energizable to illuminate said characters with light transmitted from said edge-illumination means through the edge of said disc; and a rack member movably mounted upon said gear lever and having teeth formed thereon, which teeth mesh with those on said toothed pinion to translate linear movement of said gear lever into rotary movement of said indicator member in a movement-increasing arrangement having a ratio of movement between the characters on the disc and the gear lever of more than 1 to 1, the spacing of the characters on said disc being such that, when the gear lever is in each of said predetermined positions, the corresponding character is visible through said window.

6. A gear shift indicator for a motor vehicle comprising a housing mountable within said motor vehicle and including a surface portion having an elongated slot and, adjacent said slot, a window formed therein; a gear lever pivotally mounted within said housing for movement in and along said slot into a number of predetermined positions relative to said slot; a movable indicator member located within said housing, said indicator member including a disc having a peripheral edge adjacent said surface portion and a toothed pinion mounted co-axially with respect to said disc, said disc carrying discrete legible characters on one side adjacent the peripheral edge thereof, each of which corresponds to a respective one of said predetermined positions, disc-illumination means within said housing energizable to illuminate the characters on said disc; and a rack member movably mounted upon said gear lever and having teeth formed thereon, which teeth mesh with those on said toothed pinion to translate linear movement of said gear lever into rotary movement of said indicator member in a movement increasing arrangement having a ratio of movement between the characters on the disc and the gear lever of more than 1 to 1, the spacing of the characters on said indicator member being such that, when the gear lever is in each of said predetermined positions, the corresponding character is visible through said window.

7. A gear shift indicator for a motor vehicle comprising a housing mountable within said vehicle as a console between a driver's seat and a passenger seat of said vehicle, said housing having a surface portion which has two parallel, elongated, similar slots and, between said slots, a window formed therein; a gear lever pivotally mounted within said housing for movement in and along one of said slots into a number of predetermined positions relative to said one slot; a movable indicator member located within said housing and including a disc adjacent said surface portion and a toothed pinion mounted co-axially with respect to said disc, said disc carrying discrete legible characters thereon, each of which corresponds to a respective one of said predetermined positions; an elongated plate movably mounted upon said gear lever and having teeth formed along one elongated edge thereof, which teeth mesh with those on said toothed pinion to translate linear movement of said gear lever into rotary movement of said indicator member in a movement-increasing arrangement having a ratio of movement between the characters on the disc and the gear lever of more than 1 to 1, the spacing of the characters on said indicator member being such that, when the gear lever is in each of said predetermined positions, the corresponding character is visible through said window, said elongated plate having an opening therein through which passes said gear lever, and overall dimensions such that said plate acts as a movable cover for, and thus closes, said one elongated slot; and a fixed indicator member housed within the other of said two elongated slots and carryingg thereon a schematic indication of the special relationship of each one of said predetermined positions relative to the other predetermined positions.

8. A gear shift indicator according to claim 7, including illumination means disposed within said housing and energizable to illuminate both the characters of said disc and the schematic indication on said fixed indicator member.

* * * * *

UNITED STATES PATENT AND TRADEMARK OFFICE
CERTIFICATE OF CORRECTION

PATENT NO. : 3,985,095
DATED : October 12, 1976
INVENTOR(S) : Charles A. Nurse

It is certified that error appears in the above-identified patent and that said Letters Patent are hereby corrected as shown below:

Column 1, line 53 "in" should read -- In --.

Column 3, line 32, "on" should read -- or --.

Column 6, line 47, "carryingg" should read -- carrying --.

Column 6, line 48, "special" should read -- spacial --.

Signed and Sealed this

Twenty-second Day of March 1977

[SEAL]

Attest:

RUTH C. MASON
Attesting Officer

C. MARSHALL DANN
Commissioner of Patents and Trademarks